(12) United States Patent
Loh et al.

(10) Patent No.: US 8,559,281 B2
(45) Date of Patent: Oct. 15, 2013

(54) DISK DRIVE AND TRAY CONTROL MECHANISM

(75) Inventors: Kum Chung Loh, Singapore (SG); Yu Zhou, Singapore (SG)

(73) Assignee: Koninklijke Philips N.V., Eindhoven (NL)

( * ) Notice: Subject to any disclaimer, the term of this patent is extended or adjusted under 35 U.S.C. 154(b) by 825 days.

(21) Appl. No.: 12/518,327

(22) PCT Filed: Dec. 14, 2007

(86) PCT No.: PCT/IB2007/055100
§ 371 (c)(1),
(2), (4) Date: Nov. 9, 2009

(87) PCT Pub. No.: WO2008/072208
PCT Pub. Date: Jun. 19, 2008

(65) Prior Publication Data
US 2010/0146524 A1   Jun. 10, 2010

(30) Foreign Application Priority Data
Dec. 14, 2006 (EP) .................................. 06126133

(51) Int. Cl.
*G11B 7/085* (2006.01)
(52) U.S. Cl.
USPC .................................................... 369/30.36
(58) Field of Classification Search
None
See application file for complete search history.

(56) References Cited

U.S. PATENT DOCUMENTS

| 6,191,542 B1 | 2/2001 | Chliwnyj | |
|---|---|---|---|
| 2005/0013210 A1* | 1/2005 | Lee | 369/30.27 |
| 2005/0117467 A1* | 6/2005 | Kimikawa | 369/30.27 |
| 2005/0201215 A1* | 9/2005 | Hsu et al. | 369/30.27 |
| 2005/0204373 A1* | 9/2005 | Ueno et al. | 720/616 |
| 2007/0044114 A1* | 2/2007 | Murakami et al. | 720/685 |

FOREIGN PATENT DOCUMENTS

| DE | 10215214 A1 | 10/2003 |
|---|---|---|
| FR | 2754098 A1 | 4/1998 |
| GB | 831506 | 3/1960 |
| JP | 04-004790 | 1/1992 |
| JP | 2008034030 A | 2/2008 |
| WO | 2005001827 A1 | 1/2005 |

* cited by examiner

*Primary Examiner* — Adam R Giesy
*Assistant Examiner* — Henok Heyi

(57) ABSTRACT

A method to automatically detect and rectify a tray block in a disk drive comprising detecting an occurrence of a tray block in a disk drive upon receiving a tray-out command or a tray-in command by determining whether the tray is in an intermediate position for a predetermined time period, the intermediate position being a position between a first position within a casing of the disk drive and a second position projecting completely outwards from the casing, the tray arranged to receive a record carrier when in the second position and being supported for movement between the first position and the second position. The detected tray block is rectified by cleaning a brush-commutator interface of a tray motor arranged to move the tray between the first position and the second position and is useful for optical recorders and/or players which have a design of a tray open/close mechanism.

13 Claims, 9 Drawing Sheets

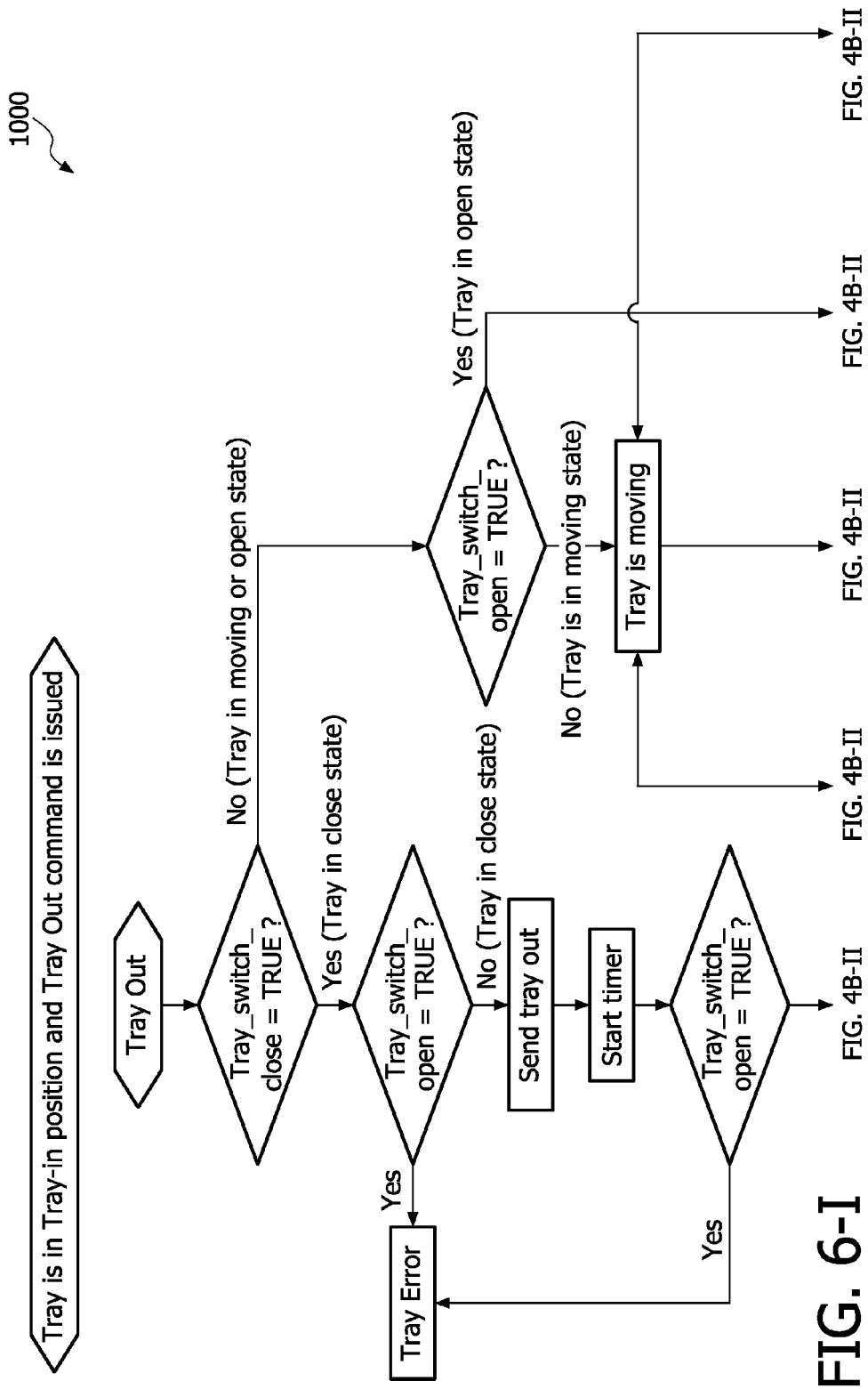
FIG. 6-I

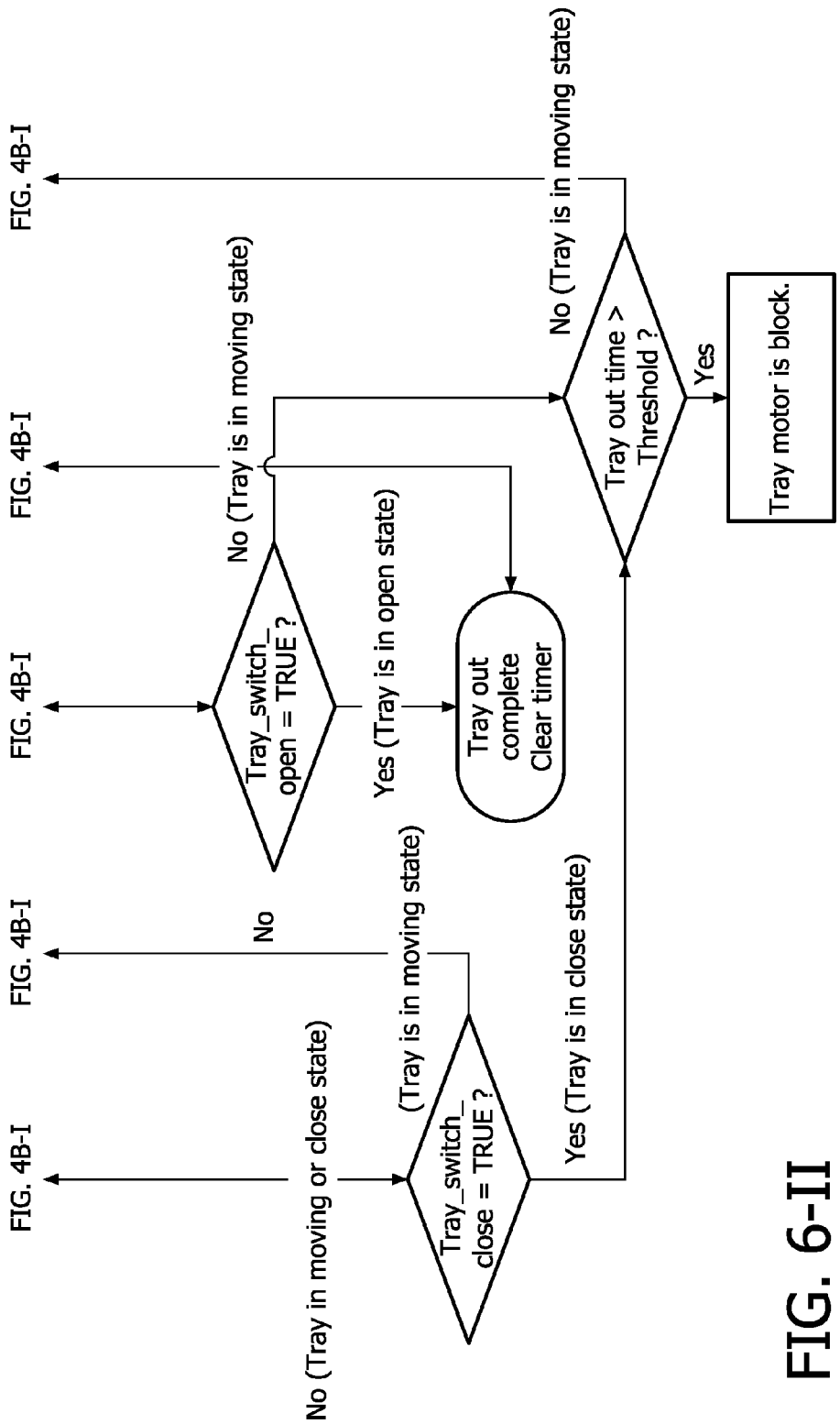
FIG. 6-II

DISK DRIVE AND TRAY CONTROL MECHANISM

FIELD OF THE INVENTION

The subject matter relates in general to disk drives, and more specifically to tray control mechanism of a disk drive.

BACKGROUND OF THE INVENTION

WO 2005/001827 discloses a disk drive comprising a tray for receiving a disk, the tray being supported for movement between a first position within a casing of the disk drive and a second position projecting from the casing, an electric motor for moving the tray between the first position and the second position, and regulation means for regulating an electric current through the electric motor for regulating the rotation of the electric motor. In such disk drives during the opening of the tray or during the closing of the tray, the tray can sometimes get blocked. The term tray block means the tray is neither in the closed position nor in the open position. The tray is struck in an intermediate position. This kind of tray blockage is undesired, especially in audio/video disk drives.

It is therefore an object of the invention to provide an improved method of automatically detecting and rectifying the tray blockage. It is a further object of the invention to provide a device for automatically detecting and rectifying the tray blockage.

SUMMARY OF THE INVENTION

The object of the invention is realized by providing a method for automatically detecting and rectifying the tray block. The method detects the occurrence of the tray block in the disk drive upon receiving a tray-out command or a tray-in command by determining whether the tray is in an intermediate position for a predetermined time period, the intermediate position being a position between a first position within a casing of the disk drive and a second position projecting completely outwards from the casing, the tray arranged to receive a record carrier when in the second position and being supported for movement between the first position and the second position. Based on the outcome of the detection, the tray block is rectified by cleaning a brush-commutator interface of a tray motor (102), the tray motor being arranged to move the tray (108) between the first position and the second position.

In an embodiment, rectifying the tray block comprises pulsating the tray motor using a pulsating voltage for a predetermined time period. Pulsation here refers to some sort of a vibration wherein one fast round trip movement of the tray between the first position and the second position determines one pulsation. This has the advantage that the rectification method is fast and automatic.

In a further embodiment, the pulsating voltage is higher than the operating voltage of the tray motor. Operating the tray motor with higher driving voltage ensures that the tray motor contamination is removed thereby rectifying the tray blockage.

In a still further embodiment, the tray-out command and the tray-in command is initiated using the normal operating voltage of the tray motor upon completing the pulsation of the tray motor. This is carried out to ensure that the contamination of the tray motor is removed and to check that the tray can be operated with normal operating voltage. This ensures the completion of the tray block cleaning process.

In a still further embodiment, a tray motor drive voltage is determined while the tray is in the intermediate position upon initiating the tray-out command or the tray-in command. The pulsating voltage for pulsating the tray motor is selected based on the maximum tray motor driving voltage allowable by the disk drive. This has the advantage that it is sufficient to overcome the increased starting torque that is needed to drive the tray motor due to the increased electric motor resistance when the tray motor is contaminated.

In a still further embodiment, the number of pulses required to rectify the tray block is counted. The tray motor is pulsated using a pulsating voltage that is a function of the counted number of pulses. The method automatically determines the number of times the tray motor clean process has to be triggered, rectifies tray blockage and thereby improves disk drive performance.

A device for automatically detecting and rectifying the tray block is disclosed. The device comprises a detection unit arranged to detect an occurrence of a tray block in a disk drive upon receiving a tray-out command or a tray-in command by determining whether the tray is in an intermediate position for a predetermined time period, the intermediate position being a position between a first position within a casing of the disk drive and a second position projecting completely outwards from the casing, the tray arranged to receive a record carrier when in the second position and being supported for movement between the first position and the second position. The device further comprises a rectification unit arranged to rectify the tray block by cleaning a brush-commutator interface of a tray motor based on the outcome of the detection unit, the tray motor being arranged to move the tray between the first position and the second position.

Furthermore, the method of detecting and rectifying the tray block could be implemented in a computer program.

BRIEF DESCRIPTION OF THE DRAWINGS

The above mentioned aspects, features and advantages will be further described, by way of example only, with reference to the accompanying drawings, in which the same reference numerals indicate identical or similar parts, and in which:

FIG. 6 is an example of a flowchart illustrating the method of detecting tray block in an example optical disk drive;

Referring to FIG. 1, the optical disk drive 100 is implemented in an outer casing CS. A tray 108 for receiving and transporting a disk 110 is capable of sliding into and from the casing CS in a direction indicated by "x". The tray 108 moves from a first position (i.e. closed position) in which it is within the casing CS to a second position (i.e. open position) projecting completely outwards from the casing CS. The tray 108 is controlled by an electric motor 102. It is noted here that the optical disk drive 100 here refers to optical disk drive such as CD, DVD and Blu-ray disk drive and the disk here refers to an optical record carrier such as CD, DVD and BD discs. It is further noted that the subject matter relates to drives in general that has a tray mechanism to load a record carrier into the drive.

In the optical disk drive, the record carrier (e.g. CD, DVD or BD disk) is loaded into the optical disk drive (e.g. CD drive, DVD drive or BD drive) by a loader mechanism, which generally comprises the tray. To play a disk or to record onto the disk, the user places the disk 110 on the tray 108, which, after the user has pressed a button or the tray itself, transports the disk 110 into the optical disk drive 100. When the tray is inside the optical disk drive, a tilting mechanism tilts the turntable upwards such that the disk is lifted off the tray. To eject the disk from the optical disk drive, the loader mechanism is driven in the reverse direction. In essence, the tray is supported for movement between a first position (i.e. closed position) within a casing of the drive and a second position (i.e. open position) projecting completely outwards from the casing.

Figure 1:
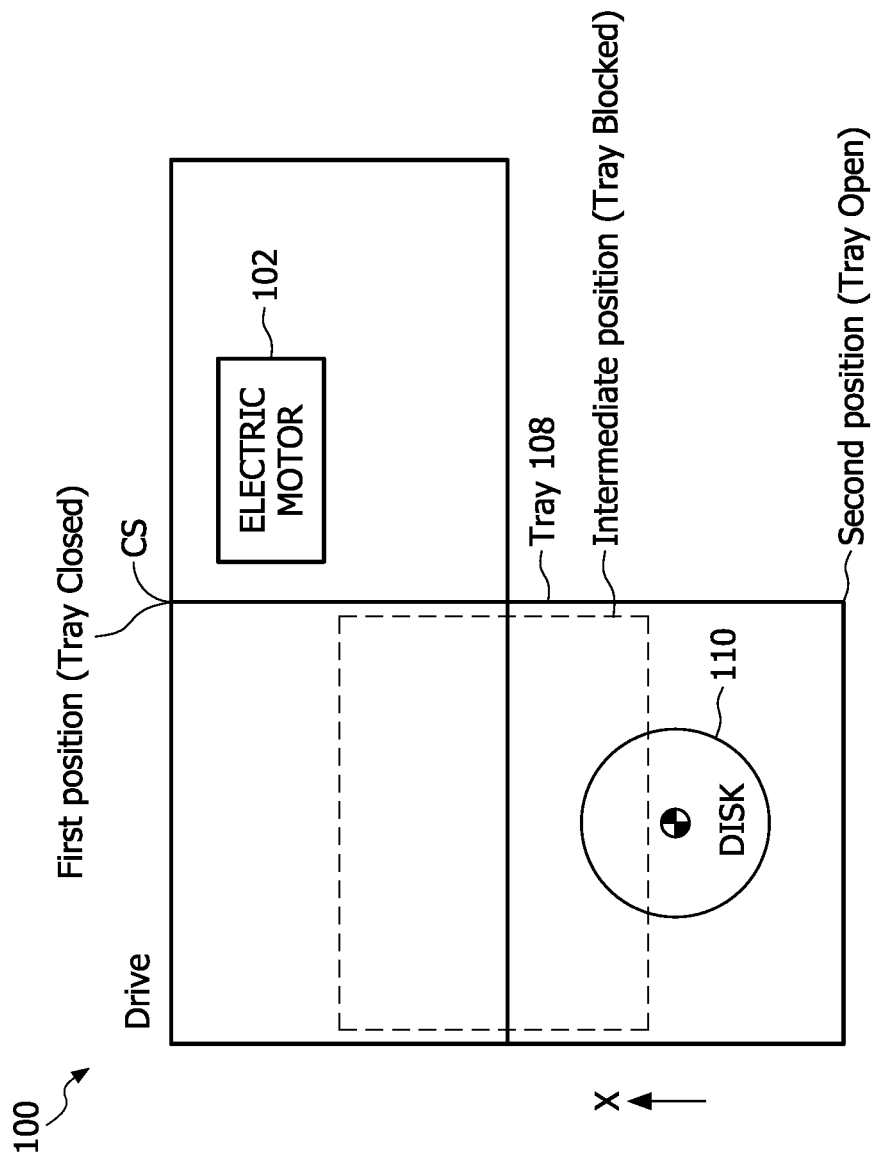
FIG. 1 shows an example of a schematic block diagram of an example optical disk drive.
Figure 2:
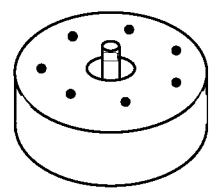
FIG. 2 and FIG. 3 shows an example of a motor used in an example optical disk drive.
Figure 3:
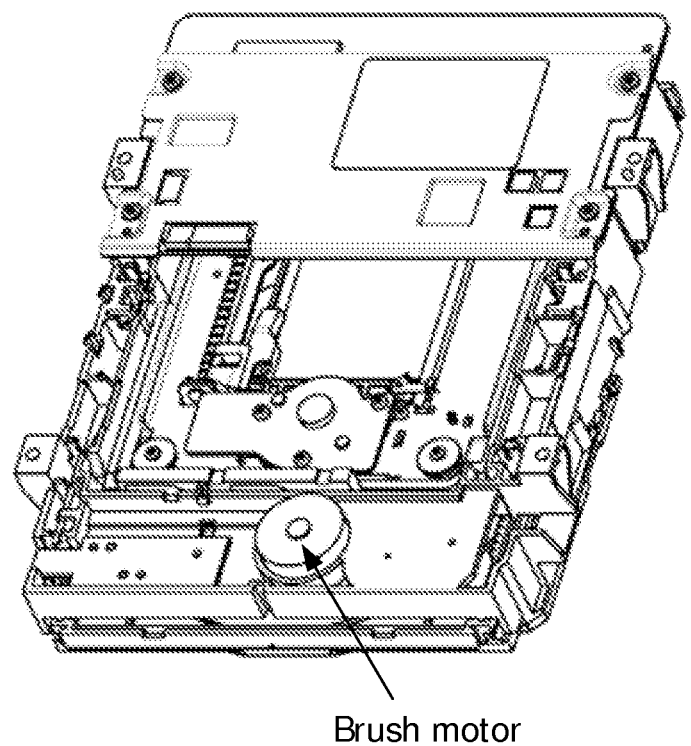
Figure 4:
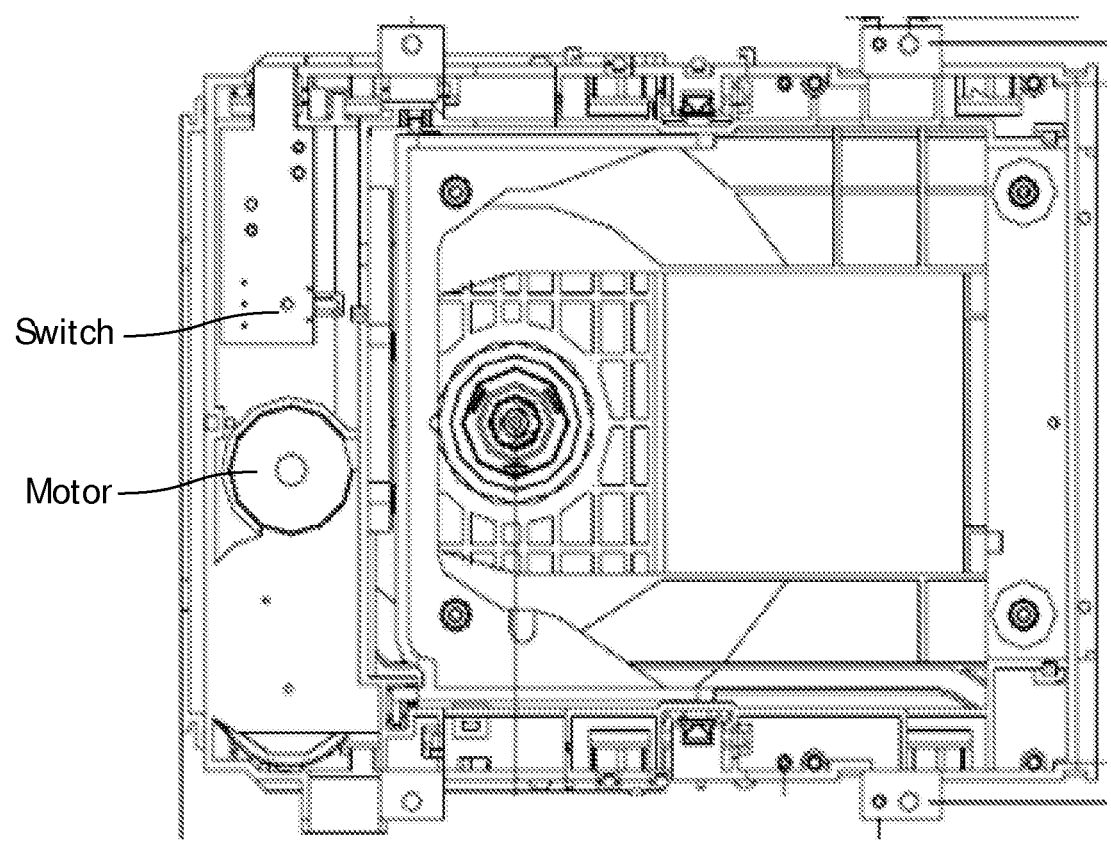
FIG. 4 shows an example of a tray switch in an example optical disk drive.

The loader mechanism is driven by the electric motor 102 via a gear transmission. FIG. 2 and FIG. 3 show an example of a brush motor used in the disk loading function in the optical disk drive 100 (Cf. FIG. 1). Generally, a hardware switch (usually mechanical or optical) is included in the optical disk drive 100 in order to detect whether the tray or the loader mechanism has completed an opening action/closing action. Such a hardware switch is generally called a tray switch and is as shown in FIG. 4. The tray switch gives complete certainty about whether the tray is actually closed; if the tray switch is closed, the tray must be in either one of its end positions (i.e. open position or closed position). There are two tray switches namely a) tray switch open and b) tray switch close. The tray open and tray close operation is controlled by the tray switch open and the tray switch close as follows: 1). When the tray switch open is true and the tray switch close is false, the tray is moving. 2). When both the tray switch open and the tray switch close are true, the tray is ready for movement. In the case of TRAY OUT operation, this means the tray out action is completed and has reported ready.

Figure 5:
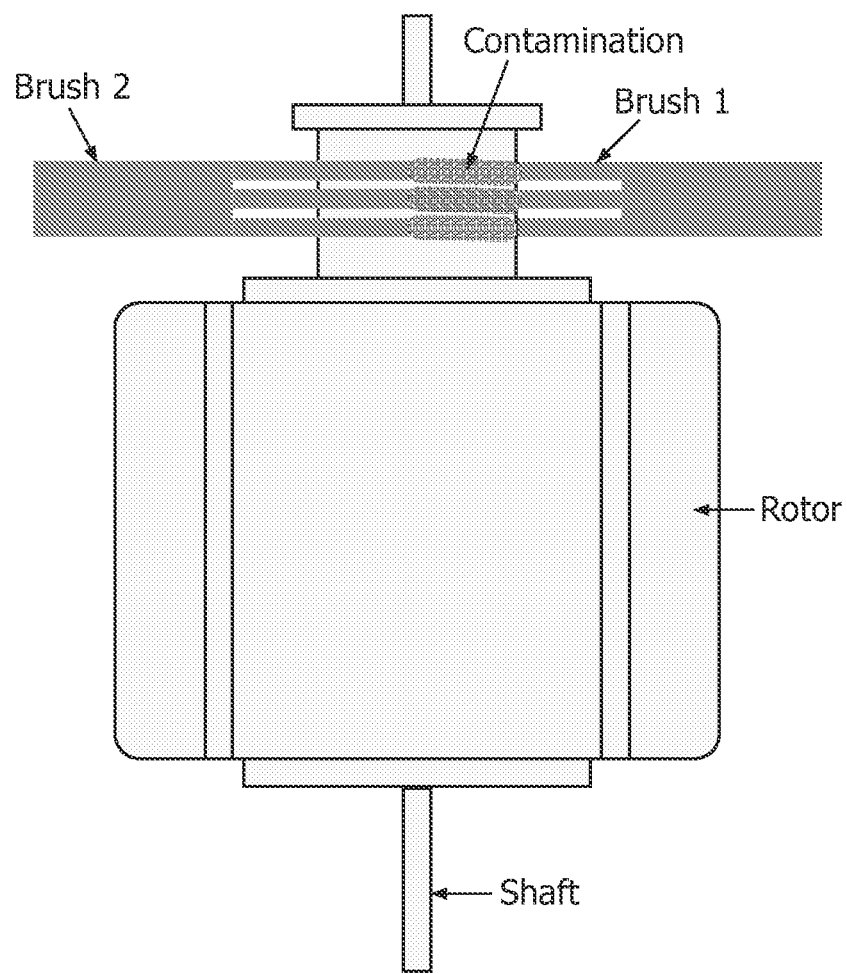
FIG. 5 shows example of brush-commutator contamination.

The brush-commutator interface of the electric motor 102 (Cf. FIG. 1) can become contaminated and may result in high motor resistance. When such a condition occurs, the electric motor 102 in the optical disk drive 100 will not function and can result in tray block. Tray block here means the tray is neither in the closed position nor in the open position. The tray is struck in an intermediate position, the intermediate position being a position anywhere between the open position and the closed position. This kind of tray blockage is undesired, especially in audio/video disk drives. Further, if the electric motor 102 is run at low currents for a long period of time, the brushes get dirty and the connection to the commutator can become unreliable. FIG. 5 shows examples of brush-commutator contamination. It is noted here that the electric motor 102 refers to a tray motor that is arranged to move the tray between the first position (closed position) and the second position (open position).

DETAILED DESCRIPTION OF EMBODIMENTS

Accordingly, a method of automatically detecting and rectifying the tray block is disclosed. The method detects the occurrence of the tray block in the disk drive upon receiving a tray-out command or a tray-in command by determining whether the tray is in an intermediate position for a predetermined time period, the intermediate position being a position between a first position within a casing of the disk drive and a second position projecting completely outwards from the casing, the tray arranged to receive a record carrier when in the second position and being supported for movement between the first position and the second position. Based on the outcome of the detection, the tray block is rectified by cleaning a brush-commutator interface of a tray motor, the tray motor arranged to move the tray between the first position and the second position.

When the tray is in open position (Cf. FIG. 1 Tray Open) and the tray is to be closed, the tray-in command is initiated. The tray-in command can be initiated after the user has pressed a button or the tray itself on sensing the disk placed on the tray. The tray-in command moves the tray from the open position to the closed position. On the other hand, when the tray is in closed position and the tray is to be open, the tray-out command is initiated. The tray-out command can be initiated after the user has pressed a button. The tray-out command moves the tray from the closed position to the open position.

The detailed working of the detection of the tray block is depicted in the example flowchart given in FIG. 6. Referring to FIG. 6, two types of switches are used to detect and control the movement of the tray. One is the physical switch (Cf. FIG. 4) and the other is the virtual switch (Cf. FIG. 6).

The physical switch is used to indicate the status of the tray. If the tray is in fully closed position, it is referred to as the first position. That is, the tray is within the casing of the optical disk drive (Cf. FIG. 1). If the tray is in fully open position, it is referred to as the second position. That is, the tray is projecting completely outwards from the casing of the optical disk drive (Cf. FIG. 1).

When the tray is in fully open or fully closed position, the TRAYSW flag is set to high. When the tray is in an intermediate position (Cf. FIG. 1 i.e. between the first position and the second position), the TRAYSW flag is set to low. Further, if the tray is in the intermediate position for a pre-determined time period, the tray is blocked. The pre-determined time period can be about 30 milliseconds. Therefore, by detecting the status of the TRAYSW flag it is possible to decide whether the TRAY is in open position or in closed position or in an intermediate position.

The statuses of the two switches are decided by the TRAYSW flag and the tray command as follows:
When tray is in fully closed state, Tray_switch_close=1, Tray_switch_open=0,
When tray is in fully open state, Tray_switch_close=0, Tray_switch_open=1

When TRAYSW=1, the virtual tray switches can be either in fully close state or fully open state. When TRAYSW=0, the virtual switches can be in tray out/in moving state which Tray_switch_close=0 and Tray_switch_open=0.

The tray blockage occurs when the electric motor 102 (Cf. FIG. 1) is contaminated. The contamination can be due to pollution in the air, outgas from packaging material or due to electric motor production quality. These contaminations can result in increase of electric motor resistance. The increased electric motor resistance can reduce the motor starting torque. The motor starting torque is $$T_s = K I_s$$

$$I_s = V_s / (R_m + R_{con})$$

Where
$T_s$=Starting torque
K=Motor Torque constant
$I_s$=Starting current $V_s$=Starting voltage
$R_m$=Motor resistance
$R_{con}$=Resistance due to contamination Certain starting torque is required to open and/or close the tray after detecting the tray blockage. In order to regain the motor starting torque $T_s$, $R_{con}$ must be reduced or minimized. With some mechanical movements between the brush and the commutator during TRAY IN position, the resistance due to contamination $R_{con}$ can be reduced. This can be regarded as a sort of cleaning process.

In an embodiment, the method rectifies the tray block by cleaning a brush-commutator interface of the tray motor based on the outcome of the detection, the tray motor being arranged to move the tray between the first position and the second position. This has the advantage that the method rectifies the problem of tray blockage without dismantling the drive and/or the motor and without the use of unfriendly, environmentally undesirable cleaning elements.

In a further embodiment, rectifying the tray block includes pulsating the tray motor using a pulsating voltage for a predetermined time period. Pulsation here refers to some sort of a vibration wherein one fast round trip movement of the tray between the first position and the second position determines one pulsation. This has the advantage that the rectification method is fast and automatic. The predetermined time period can be a short time period (around 50 milliseconds). The pulsation frequency can be around 20 Hz and the total pulsation time to clean the tray motor can be around 250 milliseconds (i.e. five times of tray motor pulsation). The pulsation can be around five short, fast rounds of tray movement. Total pulsation time period is 250 millisecond, and pulsation frequency is about 20 Hz(=1/50 milliseconds). The pulsation frequency can be varied based on the characteristics of the tray motor.

In a still further embodiment, the pulsating voltage is higher than the operating voltage of the tray motor. The tray motor 102 (Cf. FIG. 1) is activated with higher voltage pulses in clockwise/counterclockwise direction. This is implemented by driving the tray motor with a higher driving voltage (e.g. +5 volts). Operating the tray motor with higher driving voltage ensures that the tray motor contamination is removed thereby rectifying the tray blockage. This has the advantage that the method can be performed in the field where the optical disk drive 100 (Cf. FIG. 1) is used and does not require any additional components for rectifying the tray blockage.

In a still further embodiment, the tray-out command and the tray-in command is initiated using the normal operating voltage of the tray motor upon completing the pulsation of the tray motor. This is carried out to ensure that the contamination of the tray motor 102 (Cf. FIG. 1) is removed and to check that the tray 108 (Cf. FIG. 1) can be operated with normal operating voltage. Further, this check ensures the completion of the tray block cleaning process.

In a still further embodiment, a tray motor drive voltage is determined while the tray is in the intermediate position upon initiating the tray-out command or the tray-in command. The pulsating voltage for pulsating the tray motor is selected based on the maximum tray motor driving voltage allowable by the optical disk drive. This has the advantage that it is sufficient to overcome the increased starting torque that is needed to drive the tray motor due to the increased electric motor resistance when the tray motor is contaminated. When the tray blockage is detected, the tray motor clean process can be triggered that uses the maximum possible driving voltage (e.g. 5 volts) provided by the optical disk drive to perform the tray motor pulsation.

In a still further embodiment, the number of pulses required to rectify the tray block is counted. The tray motor is pulsated using a pulsating voltage that is a function of the counted number of pulses. The severity of the tray motor contamination determines the number of pulses. The method automatically determines the number of times the tray motor clean process has to be triggered, rectifies tray blockage and thereby improves optical disk drive performance.

Figure 7:
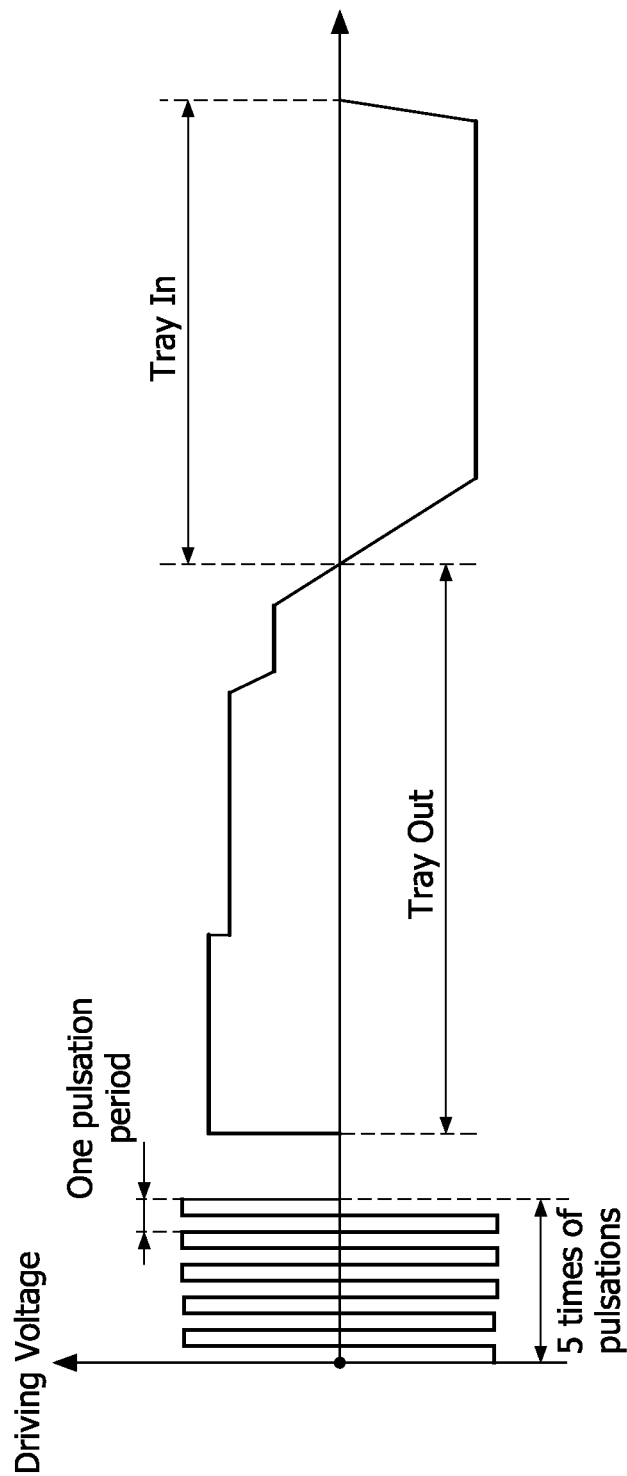
FIG. 7 shows a schematic example of tray motor drive voltage and the pulsation frequency to clean the tray block in an example optical disk drive.

One possible scenario of selecting the pulsating voltage and the pulsation frequency is shown in FIG. 7. Each time the tray motor clean process is triggered, the optical disk drive 100 (Cf. FIG. 1) will pulsate the tray motor 102 (Cf. FIG. 1) for 5 times with frequency of 25 Hz and pulsating voltage of 5 volts. When the tray motor pulsation has finished, a complete tray-out command and a tray-in command is initiated to check whether the normal tray movement is resumed (i.e., the tray blockage is rectified and the tray movement is normal). If the tray blockage is not rectified and the normal tray movement is not resumed, a second round of tray motor clean action will be repeated until the tray blockage is rectified. The tray motor clean action is repeated until the normal tray movement is resumed. After repeating the tray motor clean process for a certain number of times, if the normal tray movement is not resumed, then it is declared that the tray motor 102 (Cf. FIG. 1) has errors. The number of times the tray motor clean action has to be repeated depends on the tray motor 102 characteristics. The number of tray motor clean actions can be around ten.

Figure 8:
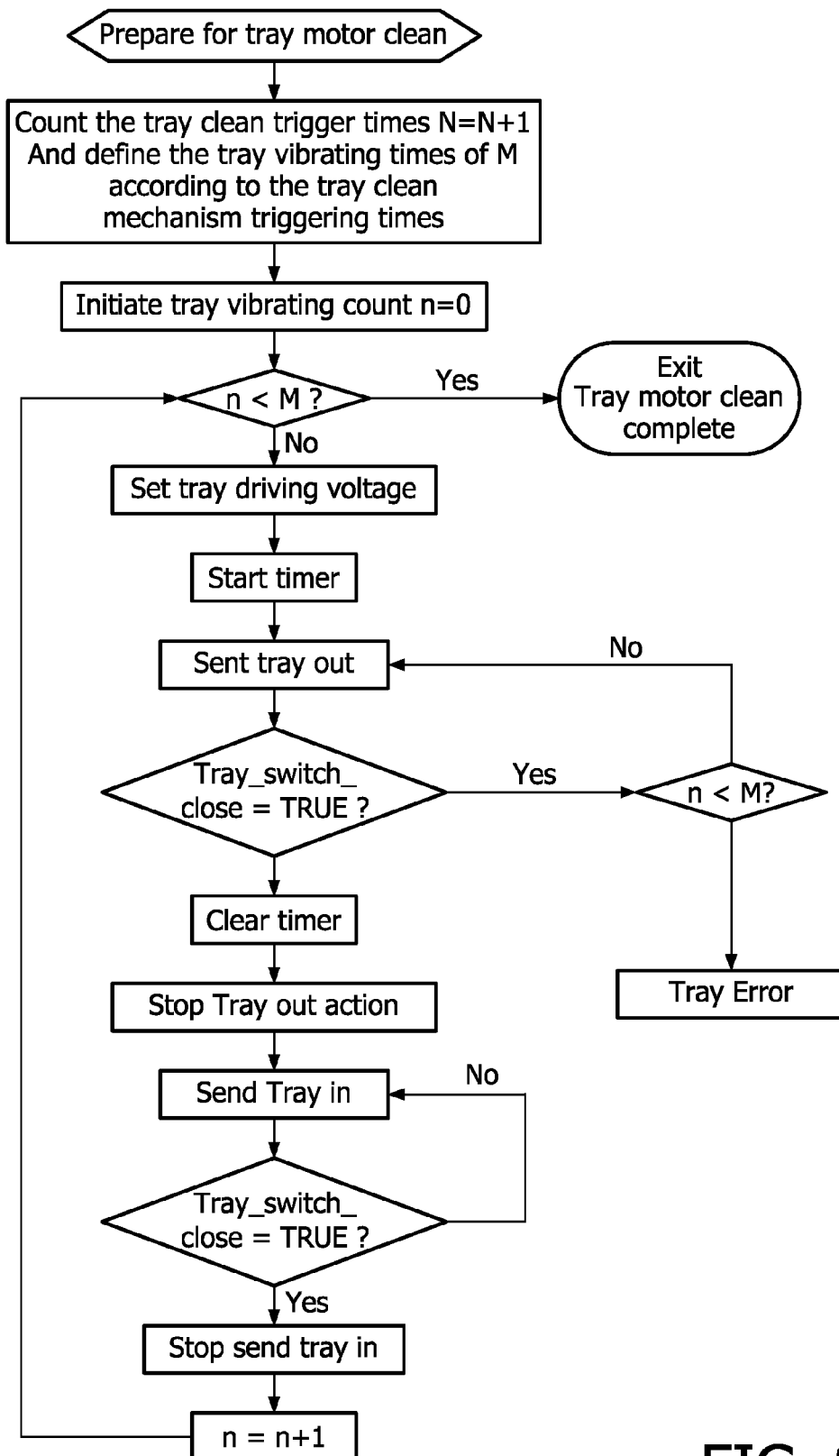
FIG. 8 is an example of a flowchart illustrating the method of rectifying the tray block in an example optical disk drive.

The detailed working of the tray block rectification method disclosed in the embodiments is shown in an example flowchart in FIG. 8. It is to be noted that the flowchart in FIG. 8 shows the steps to be carried out for one time tray motor clean action. Based on the severity of the tray motor contamination, the tray motor clean action can be repeated several times. The method can be used in all disk recorders and players such as CD, DVD and Blu-ray disk recorders and players that has the tray open and tray close mechanism. The method automatically detects tray block and rectifies the tray block thereby improving the overall disk drive performance.

Figure 9:
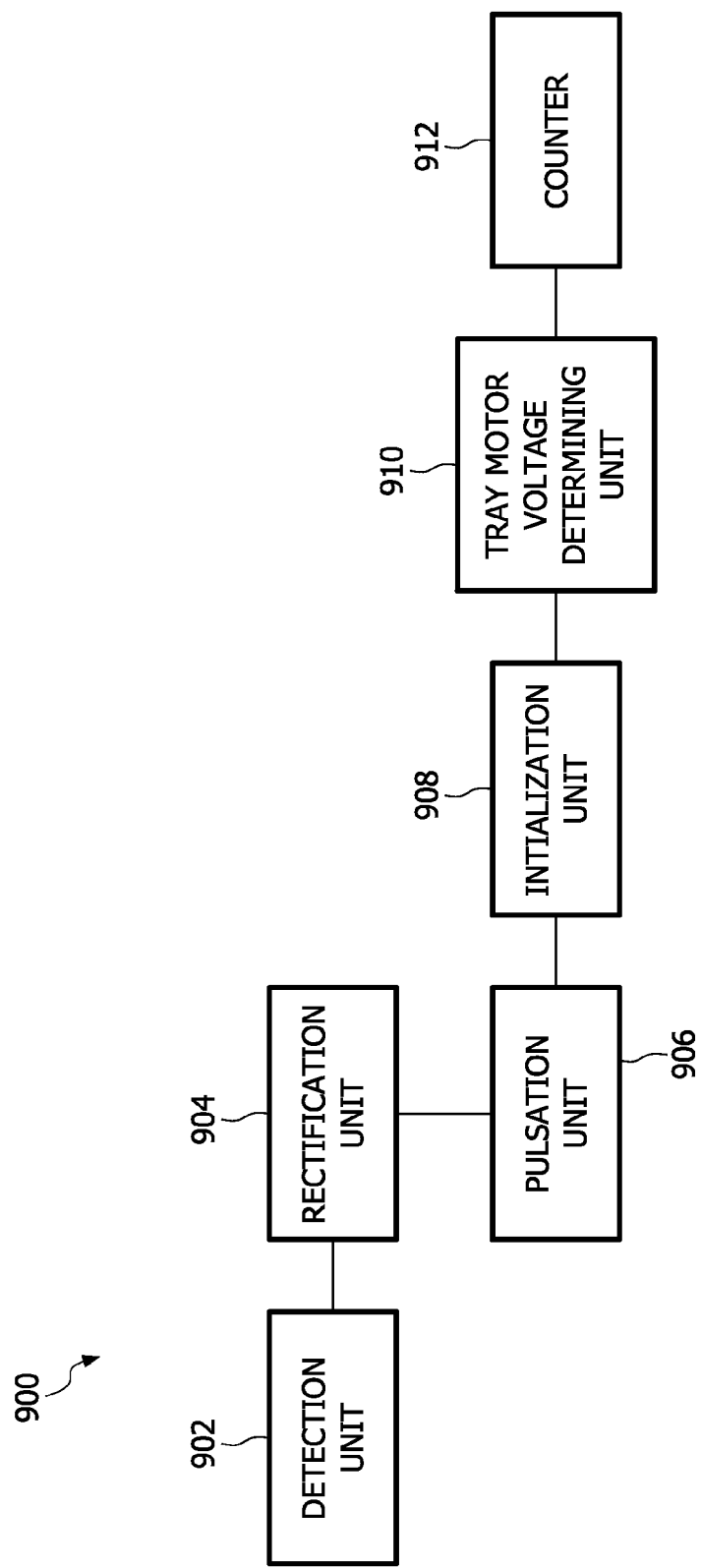
FIG. 9 shows an example of a schematic block diagram of a device used to detect and rectify the tray block in an example optical disk drive.

FIG. 9 shows a device 900 for detecting the tray blockage in an optical disk drive 100 that includes a detection unit 902 arranged to detect an occurrence of a tray block upon receiving a tray-out command or a tray-in command by determining whether the tray is in an intermediate position for a predetermined time period. The device 900 further includes a rectification unit 904 arranged to rectify the tray block by cleaning a brush-commutator interface of the tray motor based on the outcome of the detection unit. The rectification unit 904 further comprises a pulsation unit 906 arranged to pulsate the tray motor 102 using a pulsating voltage for a pre-determined time period. In operation, the optical disk drive 100 comprising the device 900 can detect and rectify the tray blockage condition automatically as described in the above embodiments. The overall drive performance can be increased.

Although the subject matter has been explained by embodiments using example optical disk drives, a person skilled in the art can implement the described embodiments of the method of detecting an occurrence of tray block and rectifying the tray block in software or in both hardware and software. Other variations to the disclosed embodiments can be understood and effected by those skilled in the art of practicing the claimed subject matter, from a study of the drawings, the disclosure and the appended claims. Use of the verb "comprise" and its conjugates does not exclude the presence of elements other than those stated in a claim or in the description. Use of the indefinite article "a" or "an" preceding an element or step does not exclude the presence of a plurality

The invention claimed is:

1. A method of controlling a drive including a tray and a motor for moving the tray to a second position in which a record carrier is received and between the second position and a first position in which the record carrier is played, the method comprising acts of:
   detecting an occurrence of a tray block exhibited when the tray is in an intermediate position for a predetermined time period, the intermediate position being between the first position and the second position; and
   rectifying the tray block by cleaning a brush-commutator interface of the tray motor.

2. The method as claimed in claim 1, wherein the act of rectifying the tray block comprises an act of: pulsating the tray motor using pulsating voltage for a pre-determined time period.

3. The method as claimed in claim 2, wherein the pulsating voltage is higher than an operating voltage of the tray motor.

4. The method as claimed in claim 3, further comprising and act of: initiating the tray-out command and the tray-in command using the operating voltage of the tray motor upon completing the pulsation of the tray motor.

5. The method as claimed in claim 2, further comprising acts of:
   determining tray motor drive voltage while the tray is in the intermediate position upon initiating the tray-out command or the tray-in command; and
   selecting the pulsating voltage to pulsate the tray motor based on the maximum tray motor drive voltage allowable by the disk drive.

6. The method as claimed in claim 2, further comprising acts of:
   counting a number of pulses required to rectify the tray block; and
   pulsating the tray motor using the pulsating voltage that is a function of the counted number of pulses.

7. A device for controlling a drive including a tray and a motor for moving the tray to a second position in which a record carrier is received and between the second position and a first position in which the record carrier is played, the device comprising:
   a detection unit configured to detect an occurrence of a tray block exhibited when the tray is in an intermediate position for a predetermined time period, the intermediate position being between the first position and the second position; and
   a rectification unit configured to rectify the tray block by cleaning a brush-commutator interface of the tray motor.

8. The device as claimed in claim 7, wherein the rectification unit comprises: a pulsation unit configured to pulsate the tray motor using a pulsating voltage for a pre-determined time period.

9. The device as claimed in claim 8, wherein the pulsation unit is configured to use a higher pulsating voltage than the operating voltage of the tray motor.

10. The device as claimed in claim 8, further comprising: an initiation unit configured to initiate the tray-out command and the tray in command using the operating voltage of the tray motor upon completing the pulsation of the tray motor.

11. The device as, claimed in claim 8, further comprising:
    a tray motor voltage determining unit configured to determine a tray motor drive voltage while the tray is in the intermediate position upon initiating the tray-out command or the tray-in command; and
    the pulsation unit further configured to select the pulsating voltage to pulsate the tray motor based on the maximum tray motor drive voltage allowable by the disk drive.

12. The device as claimed in claim 8, further comprising:
    a counter configured to count the number of pulses required to rectify the tray block; and
    the pulsation unit further configured to pulsate the tray motor using the pulsating voltage that is a function of the counted number of pulses.

13. A computer readable non-transitory medium comprising program code, which when executed by a processor performs a method of controlling a drive including a tray and a motor for moving the tray to a second position in which a record carrier is received and between the second position and a first position in which the record carrier is played, the method comprising acts of: detecting an occurrence of a tray block exhibited when the tray is in an intermediate position for a predetermined time period, the intermediate position being between the first position and the second position; and rectifying the tray block by cleaning a brush-commutator interface of the tray motor.

* * * * *